US006024348A

United States Patent [19]

Ventura et al.

[11] Patent Number: 6,024,348

[45] Date of Patent: Feb. 15, 2000

[54] ADJUSTABLE CLAMPING STAND FOR SUPPORTING AUTOMOBILE PANELS

[75] Inventors: George Ventura, Shawnee, Kans.; James D. Jenkins, Lee's Summit; Winford D. McClain, Raytown, both of Mo.

[73] Assignee: It's Dents or Us, Inc., Overland Park, Kans.

[21] Appl. No.: 09/181,256

[22] Filed: Oct. 28, 1998

[51] Int. Cl.$^{7}$ .......... B23Q 3/00

[52] U.S. Cl. .......... 269/17; 269/58; 269/71; 269/104; 269/140; 269/909

[58] Field of Search .......... 269/58, 59, 71, 269/104, 111, 140, 141, 145, 149, 210, 270, 905, 909, 45; 254/134, 133 R

[56] References Cited

U.S. PATENT DOCUMENTS

| | | | |
|---|---|---|---|
| 2,803,872 | 8/1957 | Massa | 269/71 |
| 2,827,690 | 3/1958 | Browen | 269/71 |
| 4,015,820 | 4/1977 | Davis . | |
| 4,239,197 | 12/1980 | Olstad | 269/68 |
| 4,584,863 | 4/1986 | Gaston et al. . | |
| 5,178,431 | 1/1993 | Voellmer | 269/270 |
| 5,675,417 | 10/1997 | Ventura et al. . | |
| 5,863,034 | 1/1999 | Vauter | 269/51 |

*Primary Examiner*—Timothy V. Eley
*Assistant Examiner*—Benjamin M. Halpern
*Attorney, Agent, or Firm*—Litman, Kraai & Brown L.L.C.

[57] ABSTRACT

A stand for supporting an automobile body panel having a peripheral edge for inspection and repair comprises two sets of clamping members secured on opposite ends of two clamping assemblies which are pivotally mounted to the top of a vertically oriented telescoping support assembly. Each clamping member include a clamp pad having a groove formed therein and adapted to receive a peripheral edge of the automobile body panel to support the panel during inspection and repair.

13 Claims, 3 Drawing Sheets

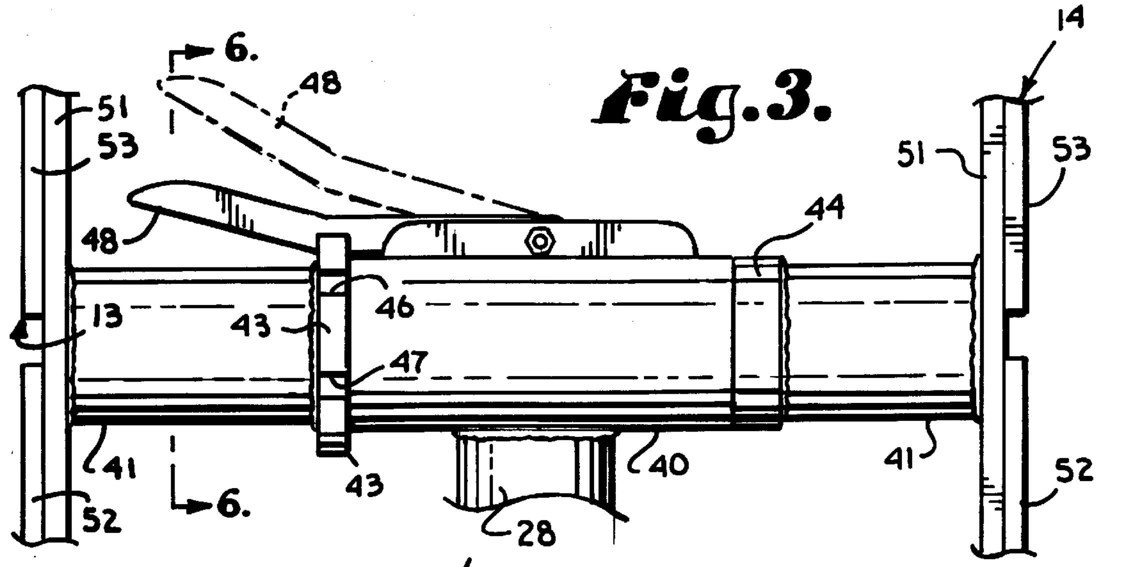
Fig. 3.
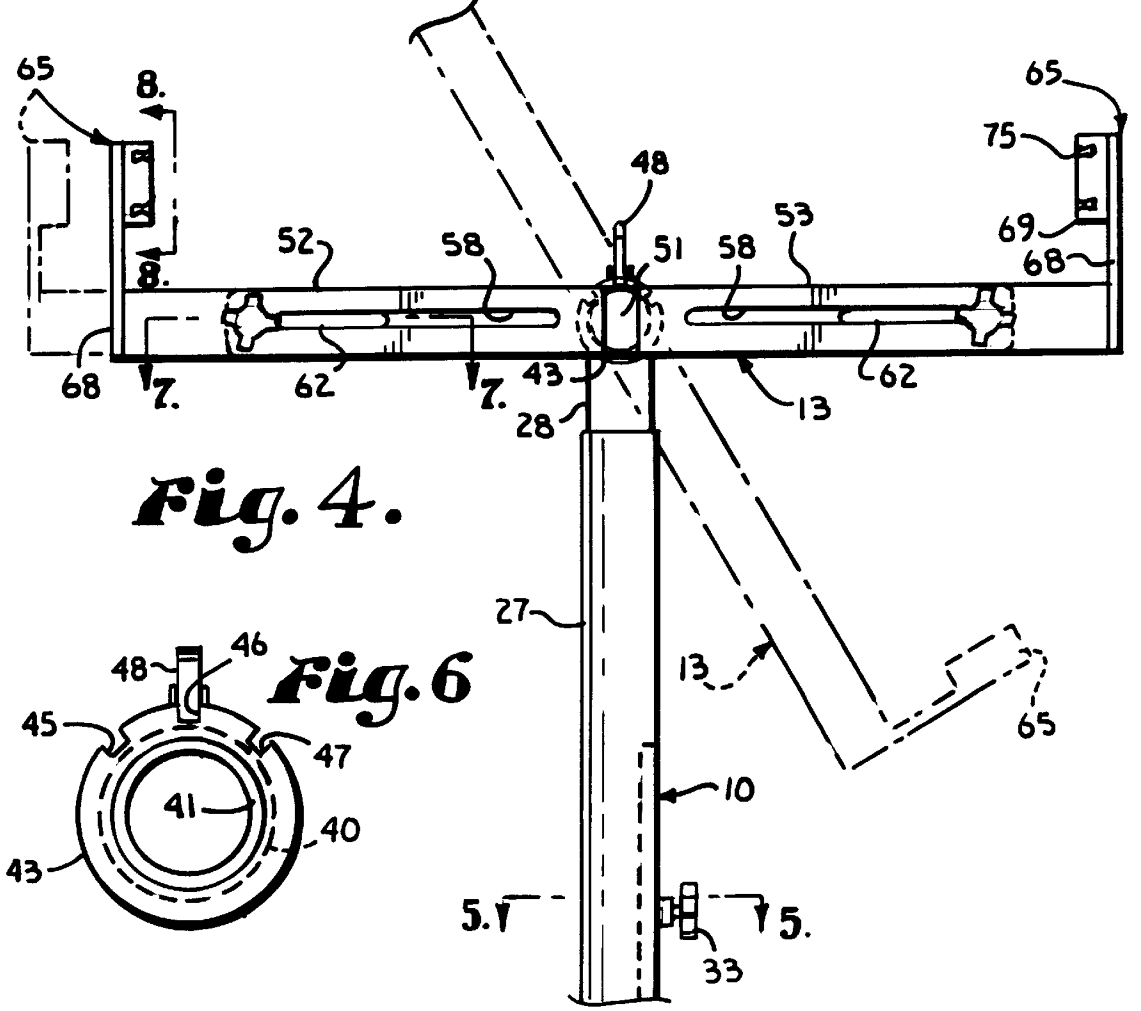
Fig. 4.
Fig. 6

ADJUSTABLE CLAMPING STAND FOR SUPPORTING AUTOMOBILE PANELS

BACKGROUND OF THE INVENTION

The present invention relates to a stand for supporting an automobile body panel to facilitate repair or inspection.

The current practice for supporting automobile body panels during repair is to simply place the panel on a table or work bench. Such a work surface is inadequate in that it does not hold the body panel in place against the forces exerted thereon during repair. In addition, such work benches only support the body panel in a horizontal plane, which often is not conducive for repairing a particular area or spot on the body panel. There remains a need for a stand for supporting an automobile body panel during repair which will securely hold the body panel in place and which is adjustable to vary the height and orientation at which the body panel is supported to facilitate repair or inspection.

SUMMARY OF THE INVENTION

A stand for supporting an automobile body panel having a peripheral edge for inspection and repair, in which the stand includes two sets of opposed clamping members each adapted to engage opposed peripheral edges of an automobile body panel for supporting and securing the automobile body panel. The stand includes a base which may be supported on casters, a vertically oriented telescoping support assembly; a horizontally aligned pivot assembly mounted to an upper end of the vertically oriented telescoping support assembly; and first and second clamping assemblies mounted on opposite ends of the pivot assembly to which the opposed clamping members are secured. The vertically oriented telescoping support assembly permits the vertical position at which the body panel is supported to be adjusted. The pivot assembly includes a mechanism for selecting the angular orientation of a body panel supported on the stand. The clamping members preferably comprises plastic blocks with grooves formed therein which are sized and shaped to receive a peripheral edge of almost any automobile body panel.

OBJECTS AND ADVANTAGES OF THE INVENTION

The objects of this invention include: providing a stand for securely supporting an automobile body panel for repair and inspection; providing such a stand which permits adjustment of the height at which the body panel is supported; providing such a stand which permits adjustment of the angular orientation at which the body panel is supported; providing such a stand which is relatively portable; providing such a stand which is adapted to support almost any automobile body panel; providing such a stand which supports an automobile body panel by engaging peripheral edges thereof; providing such a stand which is relatively inexpensive to manufacture; and providing such a stand which is particularly well adapted for its intended uses thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is an enlarged and fragmentary view of the stand as shown in FIG. 1.

FIG. 4 is an enlarged and fragmentary side elevational view of the stand with a clamping assembly thereof in a different orientation than in FIG. 1 and with fragmentary lines to show adjustability thereof.

FIG. 6 is an enlarged cross-sectional view taken along line 6—6 of FIG. 3.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
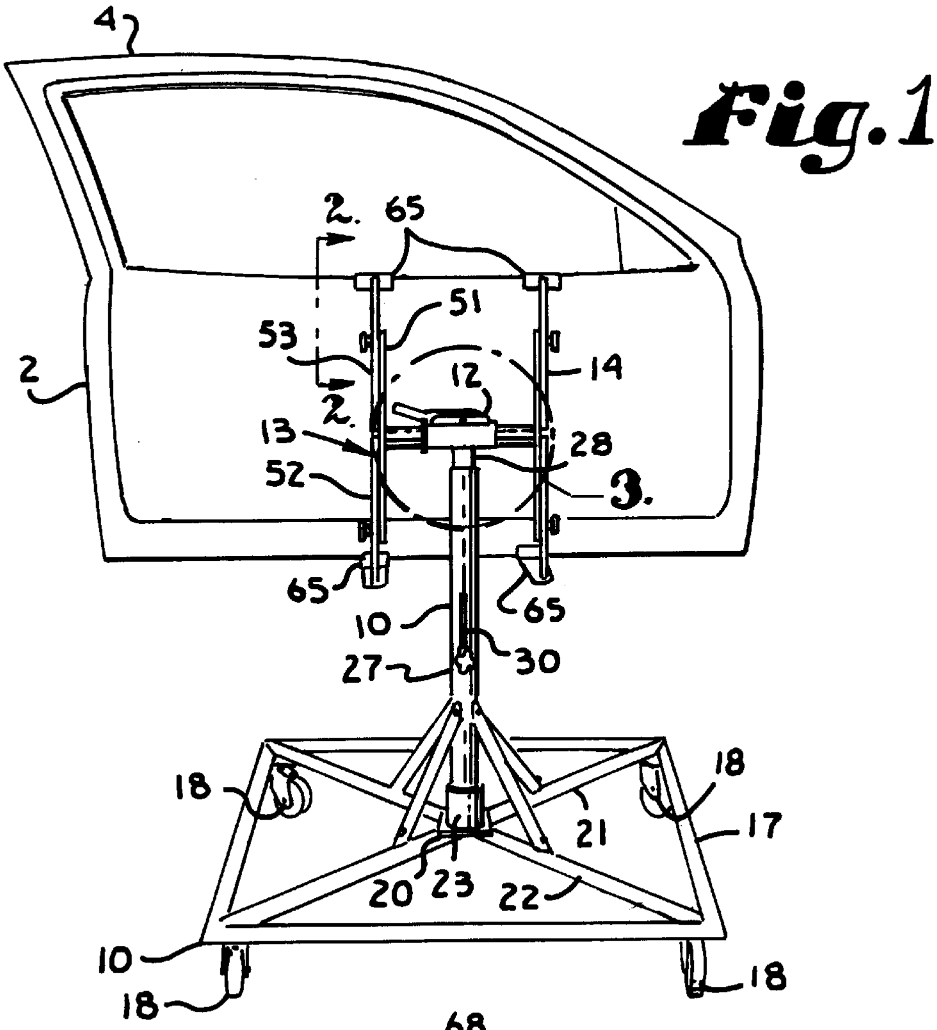
FIG. 1 is a rear perspective view showing an automobile body panel supported on an adjustable stand of the present invention.
Figure 2:
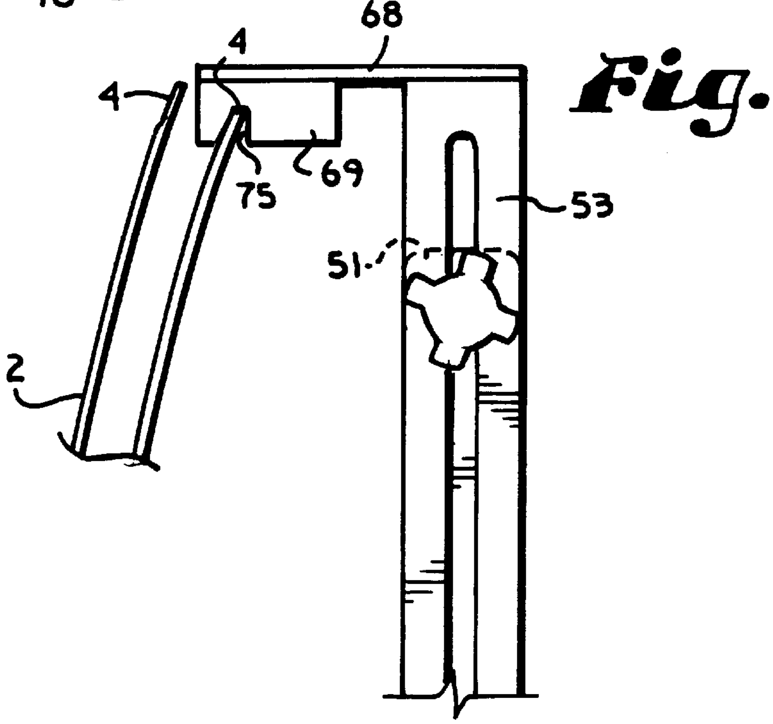
FIG. 2 is an enlarged and fragmentary cross-sectional view taken along line 2—2 of FIG. 1.

Referring to FIG. 1, the reference numeral 1 refers to an automobile body panel support stand, having an automobile body panel 2 secured thereto. The automobile body panel 2 shown comprises a door panel but the stand 1 is adapted for securing a wide variety of panels 2 thereto. Almost all automobile body panels 2 have edges, flanges or lips 4 of between ⅛ to ¼ of an inch thick extending outward from the outer periphery thereof.

The stand 1 comprises a base assembly 10, a vertically oriented telescoping support assembly 11, pivot assembly 12 mounted on top of the telescoping support assembly 11, and first and second clamping assemblies 13 and 14 mounted on opposite sides of the pivot assembly 12. The base assembly 10 includes a square frame 17. Casters 18 are removably secured to the square frame 17 at the corners. A base plate 20 is centrally mounted within the square frame 17 on cross-members 21 and 22. A mounting collar 23 is welded to the base plate 20 with its central axis extending vertically.

Figure 5:
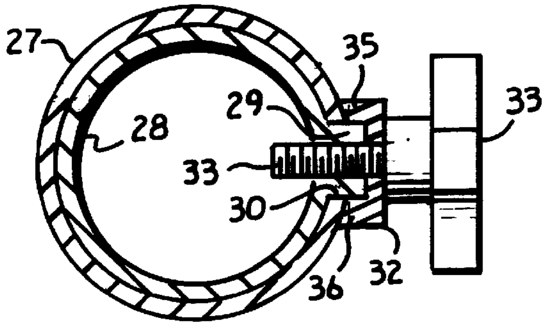
FIG. 5 is an enlarged cross-sectional view taken along line 5—5 of FIG. 4.
Figure 8:
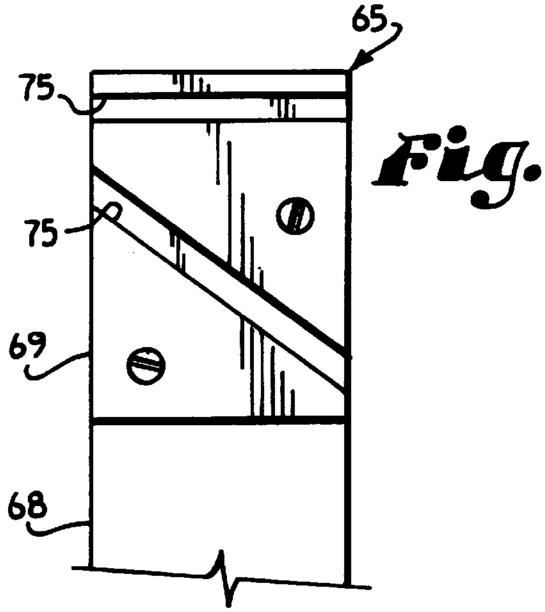
FIG. 8 is an enlarged and fragmentary view taken generally along line 8—8 of FIG. 4.

The vertically oriented telescoping support assembly 11 comprises a first or outer support tube 27 and a second or inner support tube 28. The outer support tube 27 is secured at a lower end within the mounting collar 23 and extends vertically relative thereto. The inner support tube 28 is slidingly secured within the outer support tube 27 and slides vertically relative thereto. As best seen in FIG. 5, a boss 29 is formed on the inner support tube 28 and extends through an elongated guide slot 30 extending vertically through the outer support tube 27. A U-shaped clamping bracket 32 is secured to the boss 29 by screw 33, with a relatively large, easily grippable head 34. The screw 33 extends through aligned threaded bores in the clamping bracket 32 and the boss 29. The boss 29 generally extends within a channel of the clamping bracket formed between opposed legs 35 and 36. Tightening of the screw 33 pulls an outer surface of the boss 29 against an inner surface of the U-shaped clamping bracket 32 in the channel thereof and drives the legs 35 and 36 of the clamping bracket 32 against the outer surface of outer support tube 27 thereby fixing the vertical alignment of the outer and inner support tubes 27 and 28. Loosening of the screw 33 advances the clamping bracket 32 away from the boss 29 and permits vertical telescoping of the outer and inner support tubes 27 and 28.

The pivot assembly 12 comprises an outer cylindrical sleeve 40 and a pivotal support shaft 41 rotatably mounted within the outer sleeve 40. The outer sleeve 40 is welded to the top of the inner support tube 28 perpendicular thereto. The first and second clamping assemblies 13 and 14 are mounted on opposite ends of the pivotal support shaft 41.

A slotted collar 43 is welded to the pivotal support shaft 41 adjacent a first end of the outer sleeve 40. A second collar 44 is welded to the pivotal support shaft 41 adjacent a second end of the outer sleeve 40. The slotted collar 43 and the second collar 44 prevent the pivotal support shaft 41 from sliding horizontally relative to the outer sleeve 40.

Three slots 45, 46 and 47 extend into the slotted collar 43 from the outer periphery thereof. The slots 45, 46 and 47 as shown are spaced apart at 45 degree intervals. A latch 48 is pivotally mounted on top of the outer sleeve 40. The latch 48 is sized and shaped such that a portion of the latch 48 may be advanced into one of the slots 45, 46 or 47 when the shaft 41 is rotated such that slot 45, 46 or 47 extends vertically. Advancement of the latch 48 into one of the slots 45, 46 or 47 prevents further rotation of the shaft 41, until the latch 48 is pivotally advanced out of the slot 45, 46 or 47.

Each clamping assembly 13 and 14 comprises a fixed bar 51 and first and second sliding arms 52 and 53 slidingly secured to the fixed bar 51. The fixed bar 51 is welded medially and on an inner surface thereof to an end of the pivotal support shaft 41. The first and second sliding arms 52 and 53 are slidingly secured to the outer surface of the fixed bar and on opposite ends thereof relative to the point of securement of the fixed bar 51 to the pivotal support shaft 41.

Figure 7:
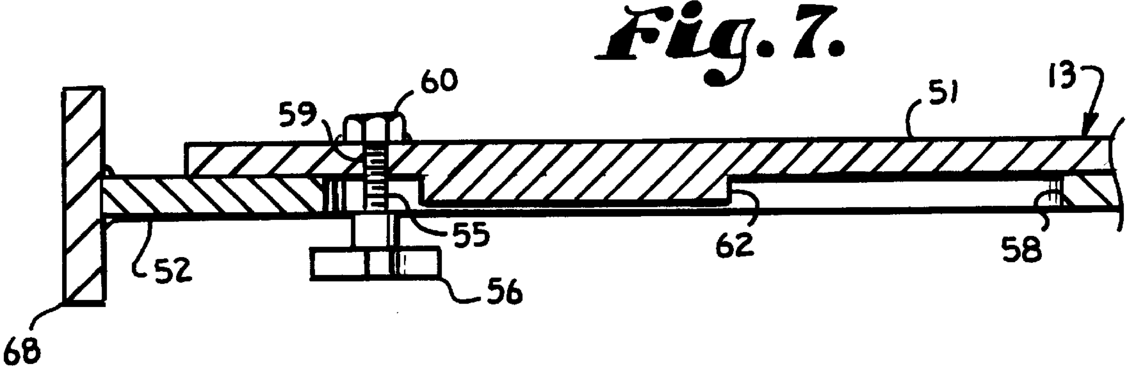
FIG. 7 Is an enlarged and fragmentary cross-sectional view taken along line 7—7 of FIG. 4.

As best seen in FIGS. 4 and 7, each sliding arm 52 and 53 is secured to the fixed bar 51 by bolt 55, with an enlarged, easily grippable head 56. The bolt 55 extends through an elongated guide slot 58 in the sliding arm 52 or 53, through a bore 59 in the fixed bar 51 and into a nut 60 welded to the inner surface of the fixed bar 51 in alignment with the bore 59. Tightening down of the bolt 55 relative to the respective sliding arm 52 or 53 presses the arm 52 or 53 against the fixed bar 51 to prevent further sliding movement relative thereto until the bolt 55 is loosened.

Elongated guide posts 62 are secured on the outer surface of the fixed bar 51 so as to extend into the guide slots 58 of the sliding arms 52 and 53. The guide posts 62 prevent the sliding arms 52 and 53 from pivoting about the bolts 55 and ensure that the sliding arms 52 and 53 slide in axial alignment relative to the fixed bar 51.

Clamping members 65 are secured to the end of each of the sliding arms 52 and 53. The clamping members 65 comprise a support plate 68 and a clamp pad 69. A support plate 68 is secured to the distal end of each of the sliding arms 52 and 53 and extends perpendicular thereto. A clamp pad 69 is secured on an inner face of each support plate 68 such that the clamp pads 69 on each clamping assembly 13 and 14 face each other and the clamp pads 69 are spaced above or outward from the fixed bar 51 and sliding arms 52 and 53 thereof.

More specifically, when the pivot assembly 12 is oriented such that the latch 48 extends into middle slot 46, the fixed bars 51 and the sliding arms 52 and 53 of each clamping assembly 13 and 14 generally extend horizontally and the support plates 68 extend vertically such that the clamp pads 69 are spaced above the fixed bars 51 and sliding arms 52 and 53 of the clamping assemblies 13 and 14.

The clamp pads 69 are formed from blocks of relatively hard plastic, such as nylon blocks, bolted to the support plates 68 and having grooves 75 machined therein. The grooves 75 are sized and shaped to receive edges 4 of an automobile body panel 2. Opposed edges 4 of an automobile body panel 2 may be supported in the grooves 75 of opposed clamp pads 69 of the clamping assemblies 13 and 14 to support the automobile body panel 2 on the stand 1. The location and shape of the grooves 75 on clamp pads 69 may be varied to accommodate differently shaped body panels 2 and different configurations of edges 4. However, placement of a groove 75 so as to extend completely across the face of the clamp pad 69 proximate a distal end thereof will generally accommodate most body panels 2. The clamp pads 69 are preferably relatively easily removable from the support plates 68 to facilitate modification of the clamp pads 69 by the user if necessary to accommodate a particular body panel design.

Opposed clamp pads 69 on sliding arms 52 and 53 of each clamping assembly 13 and 14 are slidably advanceable toward and away from each other to provide a clamping function.

Figure 9:
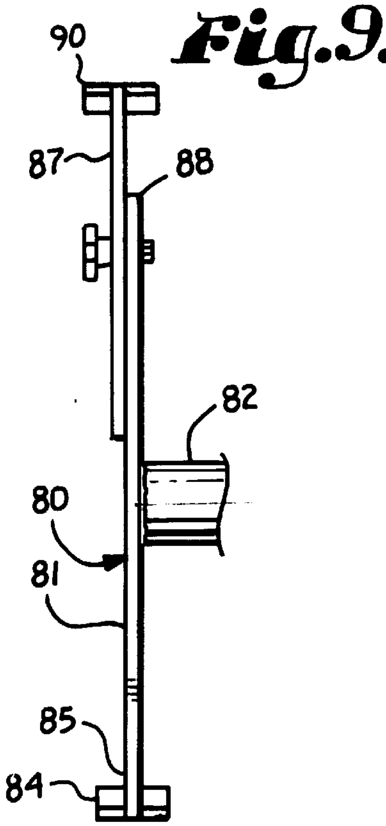
FIG. 9 is a fragmentary rear elevational view of an alternative embodiment of the stand of the present invention showing a variation of a clamping assembly.

An alternative embodiment of the present invention is shown in FIG. 9. In the alternative embodiment, only one side of each clamping assembly is adjustable. The clamping assembly 80 includes a fixed bar 81 secured medially and on an inner surface to a pivotal support shaft 82. A fixed clamping member 84 is secured to a first end 85 of the fixed bar 81. A slidable arm 87 is slidably secured to the fixed bar 81 for slidable movement relative to a second end 88 of the fixed bar. A movable clamping member 90 is secured to a distal end of the slidable arm 87 so as to be slidably advanceable toward and away from the fixed clamping member 84.

It is foreseen that other means could be utilized for providing the clamping function provided by clamping assemblies 13 and 14 or clamping assembly 80. Further it is foreseen that a wide range of means could be utilized for engaging the automobile body panel edges 4 for securing the body panel 2 to the stand.

The pivot assembly 12 permits the angle at which the body panel 2 is supported to be adjustable to facilitate repair thereof and make certain surfaces or areas of the panel 2 more accessible or more comfortable to reach. It is foreseen that a wide range of means could be utilized for fixing the rotational orientation of the support shaft 41 relative to outer sleeve 40. For example, it is foreseeable that a clamping system similar to that disclosed for fixing the vertical alignment of the outer and inner support tubes 27 and 28 could utilized for fixing the rotational orientation of the support shaft 41 relative to outer sleeve 40.

Similarly, it is foreseen that a wide range of means could be utilized for fixing the degree to which the inner support tube 28 is extended relative to the outer support tube 27. It is also foreseen that means other than the tube in tube telescoping configuration disclosed could be utilized to permit height adjustability of the stand 1.

It is to be understood that while certain forms of the present invention have been illustrated and described herein, it is not to be limited to the specific forms or arrangement of parts described and shown.

What is claimed and desired to be secured by Letters Patent is as follows:

1. A stand for supporting an automobile body panel having a peripheral edge for inspection and repair, said stand comprising:

(a) a base;

(b) a vertically oriented telescoping support assembly;

(c) a horizontally aligned sleeve connected to said vertically oriented support assembly at an upper end thereof;

(d) a pivot shaft rotatably mounted within said sleeve;

(e) a first clamping assembly having a first fixed bar mounted to a first end of said pivot shaft and further including first and second sliding arms slidably secured to said first fixed bar on opposite sides of said pivot shaft, and first and second opposed clamping members mounted on distal ends of said first and second sliding arms respectively; said first and second opposed clamping members adapted to engage opposed peripheral edges of an automobile body panel; and (f) a second clamping assembly having a second fixed bar mounted to a second end of said pivot shaft and further including third and fourth sliding arms slidably secured to said second fixed bar on opposite sides of said pivot shaft, and third and fourth opposed clamping members mounted on distal ends of said third and fourth sliding arms respectively; said third and fourth opposed clamping members adapted to engage opposed peripheral edges of an automobile body panel.

2. The stand as in claim 1 wherein:

(a) each of said first, second, third and fourth clamping members comprises a clamp pad having a groove formed therein sized and shaped to receive a peripheral edge of an automobile body panel.

3. The stand as in claim 2 wherein:

(a) said clamp pads are formed from plastic.

4. The stand as in claim 1 further comprising:

(a) means for fixing the pivotal orientation of said pivot shaft relative to said sleeve.

5. A stand for supporting an automobile body panel for inspection and repair; said body panel having a peripheral edge; said stand comprising:

(a) a base;

(b) a vertically oriented height adjustable support assembly connected to said base;

(c) a pivot shaft rotatably mounted to said height adjustable support assembly at an upper end thereof;

(d) a pair of length adjustable clamping assemblies mounted to said pivot shaft on opposite sides thereof such that said clamping assemblies are pivotal about a horizontal axis extending transverse to a vertical axis of said height adjustable support assembly; said clamping assemblies having opposed clamping members mounted on distal ends of each of said length adjustable clamping assemblies; said opposed clamping members adapted to engage opposed peripheral edges of an automobile body panel.

6. The stand as in claim 5 wherein:

(a) each of said opposed clamping members comprises a clamp pad having a groove formed therein sized and shaped to receive a peripheral edge of an automobile body panel.

7. The stand as in claim 6 wherein:

(a) said clamp pads are formed from plastic.

8. The stand as in claim 5 further comprising:

(a) means for fixing the pivotal orientation of the clamping assemblies.

9. A stand for supporting an automobile body panel for inspection and repair; said body panel having a peripheral edge; said stand comprising:

(a) a base;

(b) a vertically oriented height adjustable support assembly connected to said base;

(c) a pivot assembly mounted to said height adjustable support assembly at an upper end thereof;

(d) a pair of length adjustable clamping assembly mounted to said pivot assembly on opposite sides thereof such that said clamping assemblies are pivotal about a horizontal axis extending transverse to a vertical axis of said height adjustable support assembly; each of said clamping assemblies having a fixed member mounted to an end of said pivot assembly, a first sliding arm slidably secured to said fixed member, a first clamping member mounted proximate a distal end of said first sliding member, and a second clamping member mounted to said fixed member in opposed relationship to said first clamping member opposed clamping members mounted on distal ends of each of said length adjustable clamping assemblies; said first and second opposed clamping members adapted to engage opposed peripheral edges of an automobile body panel.

10. The stand as in claim 9 wherein:

(a) said second clamping member is slidably mounted to said fixed member.

11. The stand as in claim 9 wherein:

(a) each of said opposed clamping members comprises a clamp pad having a groove formed therein sized and shaped to receive a peripheral edge of an automobile body panel.

12. The stand as in claim 11 wherein;

(a) said clamp pads are formed from plastic.

13. The stand as in claim 9 further comprising:

(a) means for fixing the pivotal orientation of the clamping assemblies.

* * * * *